3,823,123
ANTISTATICALLY FINISHED ACRYLONITRILE
POLYMERS
Ferdinand Bodesheim, Eduard Radlmann, Armin Köhler, Ernst Gutschik, and Günther Nischk, Dormagen, Germany, assignors to Bayer Aktiengesellschaft, Leverkusen, Germany
No Drawing. Filed Sept. 17, 1971, Ser. No. 181,603
Claims priority, application Germany, Sept. 18, 1970,
P 20 46 091.7
Int. Cl. C08f *3/76, 15/02, 15/22*
U.S. Cl. 260—85.5 R  2 Claims

ABSTRACT OF THE DISCLOSURE

The invention relates to an acrylonitrile polymer composition which comprises a polymer of acrylonitrile, and from 1 to 20% by weight, based on the total composition, of an antistatic compound of the formula

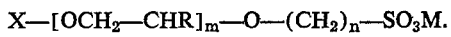
X—[OCH$_2$—CHR]$_m$—O—(CH$_2$)$_n$—SO$_3$M.

In addition to their outstanding antistatic properties, the acrylonitrile polymers treated according to the invention are distinguished by a high affinity for basic dyes and considerably improved water absorption.

---

This invention relates to antistatically finished acrylonitrile polymers.

Shaped structures made from polymers, especially fibres of copolymers consisting predominantly of acrylonitrile, generally have the unfavourable property of developing an electrical charge, which seriously restricts their range of potential commercial applications. A troublesome electrical charge of the kind in question is always encountered when the fibres have a surface resistance of more than $10^{12}$ ohms.

In principle, there are two methods for antistatically finishing synthetic high polymers used for the production of shaped structures. Either, the substance which is intended to produce the improvement in conductivity, can be applied to the surface of the article to be finished, after shaping or forming; or alternatively, the effective substance can be worked into the molten or dissolved polymer before forming or shaping. It is quite clear that antistatic agents which are applied after forming or shaping, which of course only adhere to the surface of the treated article, are highly sensitive to solvolytic or mechanical influences, and can quickly lose their effect through detachment. Accordingly, it is much better to incorporate the antistatic agents, because it is possible to obtain considerably improved stability.

Unfortunately, most of the known applied antistatic agents show hardly any effect at all after incorporation. The ineffectiveness of many of these substances is attributable to the fact that they either undergo chemical changes or decomposition during incorporation, or alternatively they are removed from the polymer material during its processing into shaped structures by evaporation or washing out. In addition, the finish and the polymer must be compatible with one another during processing, and no disintegration should occur, if an adequate degree of conductivity is to be obtained. A number of conventional surface antistatic agents do not meet this requirement either.

Most of the conventional incorporation-type antistatic agents are usually compounds which only have a relatively narrow range of application, because they do not satisfy the aforementioned requirements in every polymer. They can be divided, for example, into the following classes: phosphoric acid amides, ureas, dithiocarbonates and aminocarboxylic acid amides. Some of these are extremely difficult to obtain. In addition, the resistance to solvent of the antistatic agents in polymers finished with compounds such as these is limited, because they are washed out on account of their relatively low molecular weight.

It is an object of this invention to avoid the abovementioned disadvantages.

It has now been found that substances corresponding to the general formula

X[—OCH$_2$—CHR]$_m$—O(CH$_2$)$_n$—SO$_3$M in which

X represents a group of the formula

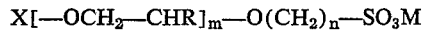
—(CH$_2$)$_n$—SO$_3$M or

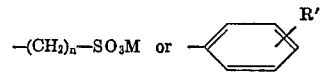

M represents an alkali or alkaline earth metal,
R represents H or an alkyl radical having 1 to 4 carbon atoms,
R' represents an alkyl radical having 4 to 12 carbon atoms,
m represents a number having an average value from 10 to 150, and
n represents an integer from 2 to 6, following their incorporation into acrylonitrile polymers in quantities of from 1 to 20% by weight, impart to these polymers a highly effective and permanent antistatic finish. In some instances, similar effects are encountered in other synthetic organic polymers.

Accordingly, this invention relates to an acrylonitrile polymer composition which comprises a polymer of acrylonitrile and from 1 to 20% by weight, based on total composition, of an antistatic compound of the formula X—[OCH$_2$—CHR]$_m$—O—(CH$_2$)$_n$—SO$_3$M in which X represents a group of the formula

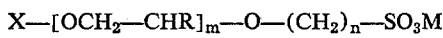
—(CH$_2$)$_n$—SO$_3$M or

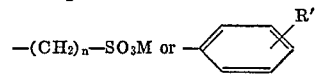

M represents an alkali metal or alkaline earth metal,
R represents H or an alkyl radical having 1 to 4 carbon atoms,
R' represents an alkyl radical having 4 to 12 carbon atoms,
m represents a number having an average value from 10 to 150, and
n represents an integer from 2 to 6.

The acrylonitrile polymers according to the invention are obtained by a process which comprises adding from 1 to 20% by weight, based on total solids, of an antistatic compound of the formula

X—[OCH$_2$CHR]$_m$—O—(CH$_2$)$_n$—SO$_3$M wherein X, R, M, m and n have the meanings given above, to a solution of an acrylonitrile polymer in a solvent, shaping the solution.

The compounds to be added in accordance with the invention can be prepared, as known *per se*, by converting the parent polyglycol derivative, optionally dissolved in an inert solvent, into the corresponding alcoholate in a dry inert gas atmosphere, and reacting the alcoholate thus obtained at elevated temperature with a sultone or an alkali metal salt of a ω-halogenosulphonic acid. Examples of suitable inert solvents include aromatic hydrocarbons such as benzene, toluene or xylene, and aliphatic or cycloaliphatic ethers such as diethyl ether, diisopropyl ether, tetrahydrofuran and dioxan. Nitrogen, hydrogen or a noble gas can be used as the inert gas. In the context of the invention, elevated temperatures are temperatures in the range from 50 to 200° C. To prepare the alcoholate, equimolecular quantities of an alkali metal can be reacted with the polyglycol derivative in the melt, although it is better to add the calculated quantity of the alcoholate of a low boiling alcohol, such as methanol or ethanol, and then to distill off the alcohol under reduced pressure.

Acrylonitrile polymers suitable for the purposes of the invention include, in addition to pure polyacrylonitrile, polymers containing at least 60% by weight of polymerised acrylonitrile and, optionally, other copolymerisable compounds, from the group of vinyl and vinylidene compounds, in copolymerised form.

Examples of copolymerisable compounds include (meth)acrylic esters, (meth)acrylicamides, vinyl esters, vinyl chloride, vinylidene chloride, and copolymerisable compounds of the kind which produce an improvement in affinity for acidic or basic dyes.

Suitable solvents include any solvent that can be used for polyacrylonitrile, especially dimethyl formamide.

It is a considerable advantage that fibres produced from the polymers treated according to the invention do not show any appreciable change in their surface resistance, even after repeated washing with alkaline detergents.

The compounds to be added in accordance with the invention are not only compatible with the described polymers and copolymers, they also allow the addition of stabilisers, fillers, dyes, pigments and antioxidants etc., without any adverse effect upon the anti-electrostatic effect attributable to these additives.

In addition to their outstanding antistatic properties, the acrylonitrile polymers treated according to the invention are distinguished by a high affinity for basic dyes and by considerably improved water absorption.

In the following preparation specifications and in the Example, the ratio of parts by weight to parts by volume is the same as in kg. to litres.

PREPARATION OF THE ANTISTATIC ADDITIVES
vot-rcETAOIN SHRDL (A) 100 parts by weight of polyethylene glycol having a molecular weight of 2000 are fused and a solution of 5.4 parts by weight of sodium methoxide in 100 parts by volume of absolute methanol is added to the resulting melt. The methanol is distilled off in a water jet vacuum at a bath temperature of 120° C. until the product is constant in weight. After flushing with nitrogen, 13.6 parts of butane sultone are added dropwise, and the temperature is increased to 160° C. The mixture is stirred at this temperature for a period of 2 hours, a colourless waxlike product being obtained after cooling.

(B) 4.6 parts by weight of metallic sodium are dissolved under nitrogen at 120° C. in 200 parts by weight of ethoxylated p-nonylphenol having a molecular weight of 1000. After all the sodium has dissolved, 27.2 parts by weight of butane sultone are added dropwise after the temperature has been increased to 150° C., followed by stirring for 1 hour. A pale yellow wax is obtained after cooling.

(C) 2.16 parts by weight of sodium methoxide are added to 100 parts by weight of ethoxylated p-dodecylphenol having a molecular weight of 2500 and the methanol formed by equilibration is distilled off in a water jet vacuum at 130° C. until the product is constant in weight. 5.44 parts by weight of butane sultone are added dropwise to the melt over which a gentle stream of nitrogen is passed at a temperature of 130° C., followed by stirring for 3 hours at this temperature. The melt solidifies on cooling into a colourless wax.

(D) 75 parts by weight of polyethylene glycol having a molecular weight of 2500 are reacted under nitrogen at reflux temperature with 1.38 parts by weight of sodium in 500 parts by volume of absolute dioxane. After the evolution of hydrogen has abated, 8.16 parts by weight of butane sultone are added dropwise at boiling temperature, followed by stirring for 5 hours. A colourless wax is left after the dioxan has been distilled off in vacuo, followed by cooling.

(E) 10.8 parts of sodium methoxide are introduced into 140 parts by weight of ethoxylated p-nonylphenol having a molecular weight of 700, and the methanol formed is evaporated at 100° C. in a water jet vacuum, followed by the introduction of 24.4 parts by weight of propane sultone. The product is then stirred for another hour at 130° C., after which it is left to cool, giving a yellowish wax.

The following example is to further illustrate the invention without limiting it.

EXAMPLE

Antistatic agents (A) to (D) were incorporated into a 25% by weight solution of an acrylonitrile homopolymer having a K-value of 81 (according to Fikentscher, Cellulose Chemie, 13 (1932), page 58). The solution was dry spun in known manner and a fabric was knitted from the filaments thus obtained; non-modified material was similarly processed for comparison. After conditioning for 48 hours (23° C., 50% relative humidity), the surface resistance of the two samples was determined by means of a cutting instrument (100 mm. cutting length; 10 mm. cutting interval) and a high ohmmeter of the kind manufactured by Messrs. Knick, and compared. Washing was carried out with a 0.5% by weight solution of a standard detergent at 40° C., the samples being re-conditioned as described above before the measurements. The results are set out in the following Table.

TABLE

| Additive | Resistance | | | |
| --- | --- | --- | --- | --- |
| | Initial | After one wash | After five washes | After ten washes |
| None | $9 \cdot 10^{12} \Omega$ | $>10^{13} \Omega$ | $>10^{13} \Omega$ | $>10^{13} \Omega$ |
| 7% by weight of A | $6 \cdot 10^{10} \Omega$ | $9 \cdot 10^{10} \Omega$ | $2 \cdot 10^{11} \Omega$ | $2 \cdot 10^{11} \Omega$ |
| 7% by weight of B | $3 \cdot 10^{10} \Omega$ | $5 \cdot 10^{10} \Omega$ | $7 \cdot 10^{10} \Omega$ | $9 \cdot 10^{10} \Omega$ |
| 5% by weight of C | $8 \cdot 10^{10} \Omega$ | $9 \cdot 10^{10} \Omega$ | $2 \cdot 10^{11} \Omega$ | $1 \cdot 10^{11} \Omega$ |
| 8% by weight of E | $5 \cdot 10^{11} \Omega$ | $7 \cdot 10^{10} \Omega$ | $1 \cdot 10^{11} \Omega$ | $2 \cdot 10^{11} \Omega$ |

What is claimed is:

1. An acrylonitrile polymer composition which comprises a polymer of acrylonitrile and from 1 to 20% by weight, based on total composition, of an antistatic compound of the formula $$X\text{---}[OCH_2\text{---}CHR]_m\text{---}O\text{---}(CH_2)_n\text{---}SO_3M$$

in which

X represents a group of the formula

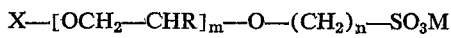 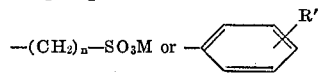

M represents an alkali metal or alkaline earth metal,
R represents H or an alkyl radical having 1 to 4 carbon atoms,
R' represents an alkyl radical having 4 to 12 carbon atoms,
m represents a number having an average value from 10 to 150, and
n represents an integer from 2 to 6;

said polymer of acrylonitrile consisting essentially of polyacrylonitrile or copolymers of acrylonitrile wherein the acrylonitrile content is at least 60% by weight and the remainder is a comonomer selected from the group consisting of viny monomers and vinylidene monomers.

2. Composition of Claim 1 wherein said comonomer is acrylic ester, methacrylic ester, acrylamide, methacrylamide, vinyl ester, vinyl chloride, or vinylidene chloride.

References Cited

UNITED STATES PATENTS 3,376,277  4/1968  Seifert et al. _____ 260—85.5 R
3,737,420  6/1973  Brokmeier et al. ___ 260—85.5 R

FOREIGN PATENTS 2,972  1/1970  Japan.

HARRY WONG, Jr., Primary Examiner

U.S. Cl. X.R.

260—32.6 N, 88.7 B, 88.7 D, DIG. 15